United States Patent [19]

Bowman

[11] 4,155,063
[45] May 15, 1979

[54] TEMPERATURE SENSOR MEANS

[75] Inventor: Paul E. Bowman, Mansfield, Ohio

[73] Assignees: Aloysius J. Kochanski, Southfield, Mich.; Charles J. Hire, Mansfield, Ohio

[21] Appl. No.: 818,387

[22] Filed: Jul. 25, 1977

[51] Int. Cl.² .............................................. H01C 3/04
[52] U.S. Cl. ........................................ 338/28; 29/612; 73/362 AR; 338/270; 338/229; 338/302; 338/304
[58] Field of Search .............. 338/25, 28, 62, 30, 338/267, 268, 270, 302, 303, 304, 229; 73/362 AR; 29/612

[56] References Cited

U.S. PATENT DOCUMENTS

| 2,588,014 | 3/1952 | Knudsen ................. 73/362 AR X |
| 2,640,902 | 6/1953 | Aske et al. .............................. 338/28 |
| 2,776,413 | 1/1957 | Knouse ............................. 338/302 X |
| 2,853,587 | 9/1958 | MacCauley ......................... 338/302 |
| 3,881,163 | 4/1975 | Lindroth et al. .................... 338/302 |
| 3,890,588 | 6/1975 | Kanaya et al. ............. 73/362 AR X |

FOREIGN PATENT DOCUMENTS 538584  3/1957  Canada ..................................... 338/268

Primary Examiner—C. L. Albritton
Attorney, Agent, or Firm—Lon H. Romanski

[57] ABSTRACT

A probe-like temperature sensor assembly has a body carrying thereon a length of electrical resistance wire coiled thereabout and having ends of such coiled resistance wire electrically connected to respective terminal means; the resistance wire changes its electrical resistance in response to the temperature of such wire resulting primarily from the heat communicated thereto from the sensed environment; the portion of the body about which the resistance wire is coiled is provided with a slot-like or relieved portion as to accommodate for difference in the rates of thermal expansion in the materials forming the body and resistance wire as to thereby preclude the mechanical fracturing of the resistance wire by the body which would otherwise occur due to a comparatively excessive rate of thermal expansion in such body.

19 Claims, 5 Drawing Figures

U.S. Patent  May 15, 1979  4,155,063
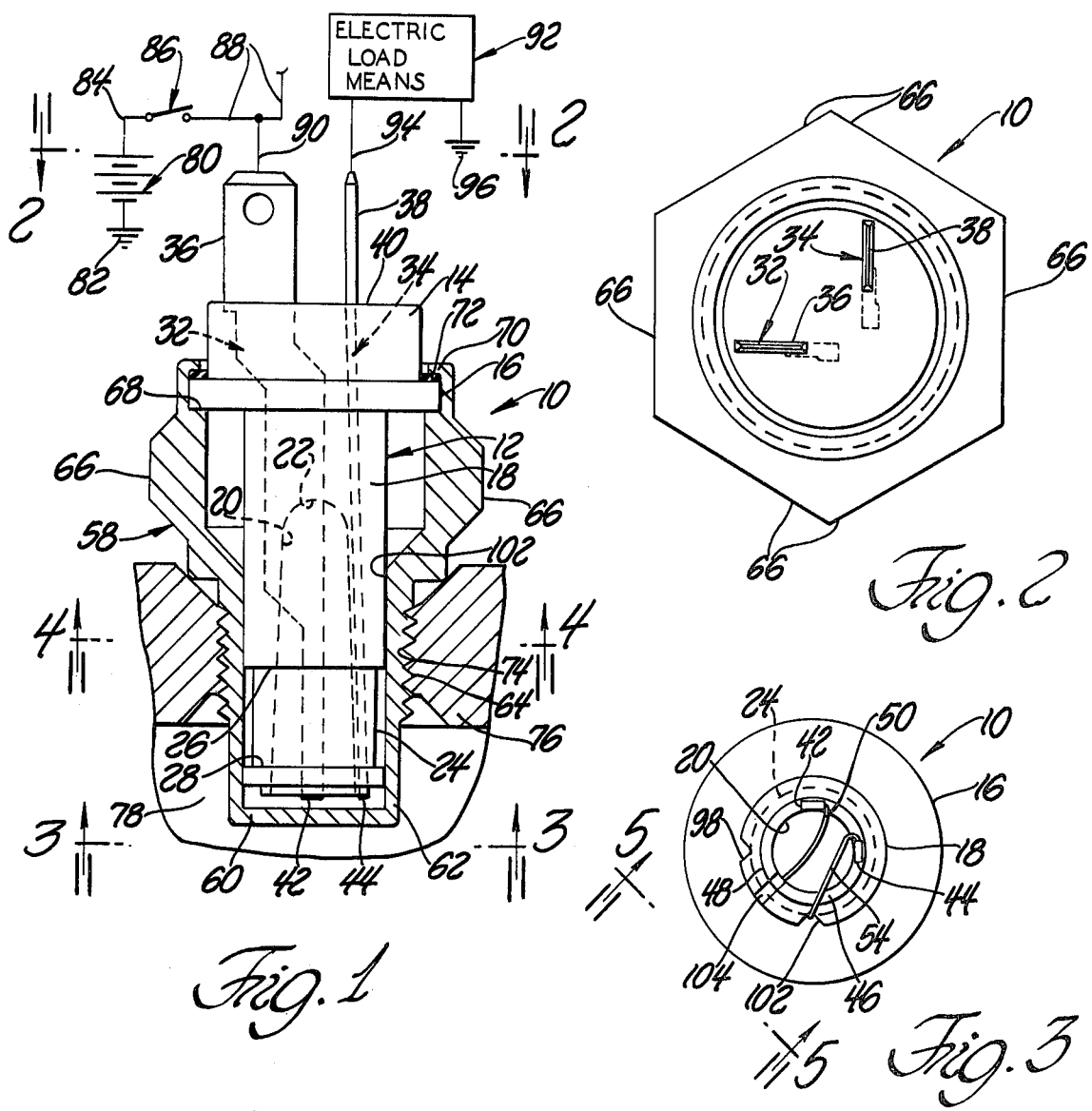

TEMPERATURE SENSOR MEANS

BACKGROUND OF THE INVENTION

Temperature sensors of the type employing a resistance wire are generally well known in the art. However, problems have heretofore occurred with respect to the making of a temperature sensor within a portion thereof is like a spool carrying the resistance wire and more particularly where the resistance wire is in the form of a coil having, for example, 500 turns and being of relatively small cross-sectional diameter as, for example, 0.0015 inch.

In such prior art structures, it has been found that most had failed shortly after use had commenced. The failure always occurred in the resistance wire and was not limited to a fracture or break in only one "turn" or coil of the wire. Attempts to correct this, as by employing different materials of increased strength and/or altering the configuration of the spool-like portion, did not succede.

However, it has now been discovered that the cause of such resistance wire failure is due to the thermal expansion, of the spool-like portion, which causes the coiled resistance wire to experience mechanical radial expansion to the degree that a fracture (or fractures) occurs therein. It has also been discovered that such thermal expansion of the material forming the spool-like portion can be permitted, without causing a fracture in the coiled resistance wire, as long as the direction of such thermal expansion is permitted to occur not exclusively in the radial direction.

Accordingly, the invention as herein disclosed and claimed is primarily directed to the solution of the foregoing as well as other related and attendant problems.

SUMMARY OF THE INVENTION

According to the invention, a body member carrying a length of coiled wire is provided with slot-like or relieved portion means for permitting the material forming the body to expand without such expansion being exclusively in the radially outward direction toward said length of coiled wire.

Various general and specific objects and advantages of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted from one or more views:

FIG. 1 is an elevational view, partly in vertical axial cross-section, of a temperature sensor assembly employing teachings of the invention;

FIG. 2 is a top plan view of the sensor assembly of FIG. 1 taken generally on the plane of line 2—2 of FIG. 1 and looking in the direction of the arrows;

FIG. 3 is a bottom plan view of the sensor assembly of FIG. 1, with portions thereof removed, taken generally on the plane of line 3—3 of FIG. 1 and looking in the direction of the arrows;

FIG. 4 is an enlarged cross-sectional view taken generally on the plane of line 4—4 of FIG. 1, with certain elements eliminated, and looking in the direction of the arrows; and FIG. 5 is an enlarged, generally side elevational view, of a portion of the said sensor assembly taken generally on the plane of line 5—5 of FIG. 3 and looking in the direction of the arrows with certain portions thereof broken away.

DETAILED DESCRIPTION OF THE PREFERRED EMBODIMENT

Referring now in greater detail to the drawings, FIG. 1 illustrates a temperature sensor assembly 10 as comprising a generally cylindrical body 12 having an upper relatively enlarged end portion 14 and an annular flange 16 with a longitudinally extending body portion 18 depending therefrom. In the preferred form, a cavity or cylindrical recess 20 is formed axially within body portion 18 in a manner terminating as in a spherical end wall surface 22. The body portion 18 is also formed as to define a necked-down or stepped surface 24 which, cooperating with annular end wall surfaces 26 and 28, defines a spool-like structure for carrying thereabout, and containing within surfaces 26,28, a related coil of resistance wire 30 (not shown in FIG. 1).

The body 12 is preferably formed of a thermo-setting plastic dielectric material which, as shown, carries a pair of electrically conductive terminal members 32 and 34 situated as to have their respective upper ends 36 and 38 extending upwardly above the top surface 40 of body 12 and their respective lower ends 42 and 44 generally bent over or peened as against end surface 46 of the cylindrical extension 48 formed integrally with body portion 18. As best seen in FIGS. 1 and 4, the terminals 32 and 34 are carried as to be generally enveloped by the material forming body 12 over that portion of such terminals as extend between opposite ends of the body 12.

As generally depicted in FIGS. 3 and 5, the coiled resistance wire 30 has, as for example, an inner end segment 50 thereof electrically connected as at end 52 to the lower end 42 of terminal 32 while an outer end segment 54 of coil 30 is electrically connected as at its end 56 to the lower end 44 of terminal 34.

As generally illustrated in FIGS. 1 and 2, the entire body 12 and coiled resistance wire 30 carried thereon may be received as with a cup-like outer housing 58 which has a closed bottom end wall 60 integrally formed with a tubular wall 62 which, in turn, is provided with an externally formed threaded portion 64 and a nut-like configuration, as viewed in FIG. 2, defining a plurality of tool-engaging surface means 66. An annular stepped seating surface 68, provided internally of and near the upper end of housing 58, is adapted to receive, thereagainst, the lower surface of flange 16 which, in turn, is secured in such position as by the upper end 70 of housing 58 being rolled-over or otherwise formed against the upper surface of the same flange 16. In the preferred embodiment, a suitable annular sealing member 72 is situated between the formed-over portion 70 and flange 16.

As shown, the entire assembly 10 may be threadably engaged within a cooperating threaded aperture 74 formed as within a combustion engine (a portion of which is shown at 76) as to thereby present the lower end of the assembly 10 to, for example, the engine coolant as may exist within related engine coolant passage means 78.

The additional environment illustrated in FIG. 1 may comprise a suitable source of electrical potential 80 grounded as at 82 and electrically connected, as through conductor means 84, to related switch means 86 (which, for example, may be the key operated engine ignition and electrical switch within a related vehicle) and, via conductor means 88 and branch conductor means 90 to end 36 of terminal or conductor means 32. Conductor means 88 may continue, as is generally well known in the art, to other electrical circuitry related to, for example, the said vehicle and/or engine.

Related electrical load means 92 is electrically connected as by conductor means 94 to end 38 of terminal or conductor means 34 and grounded as at 96. The related electrical load means 92 may be of any suitable type or configuration for causing, for example, an output signal which may be visual and/or auditory; also, such load means 92 may be effective for, in turn, producing a particular control function within related control circuit means. In any event, the electric load means 92 is herein presented merely to illustrate, in a broad sense, the overall operation of the sensor means 10. In one embodiment of the invention, the wire coil 30 was formed of nickel wire of 0.0015 inch diameter and wound onto spool-like surface 24 as to have approximately 500 turns. In that particular embodiment, the resistance thereacross changed to 1000 ohms at a temperature of 150° F. Therefore, when the sensor assembly 10 was employed in combination with, for example, an engine coolant system, and when the wire 30 attained the temperature of 150° F., the resulting ohmic value was sufficient to cause the related electric load means to react in the particular manner desired (and preselected).

As can best be seen in FIGS. 3 and 5, the lower end of body portion 18 may be provided with radially inwardly directed notches or recesses 98 and 100 which are effective for providing for the passage therethrough of a section of the coiled wire 30, as generally depicted by portion 54. In this manner even when the outer diameter of body portion 18 is tightly received within the inner diameter 102 of outer housing 58, such portion or portions of coil 30 may pass from the spool-like area to the related bottom ends of terminal means 32 and/or 34.

As also best shown in FIGS. 3 and 5, the invention comprises a relieved or slot-like opening or portion 104 which, in the preferred embodiment, has an open end 106. It has been discovered that the provision of even only one such slot or relief means 104 enables the creation of a sensor assembly, as generally depicted, wherein resistance wire of very small cross-sectional thickness is coiled about a spool section and wherein the apparent rates of thermal expansion of the wire and the material forming the spool section are sufficiently different as to otherwise result in a failure or fracture of the wire due to the thermally induced radial growth of the spool section. Although it is not totally known exactly why the results obtained are in fact obtained, it is believed that the slot or relief means 104, forming in effect, a discontinuous portion in the spool 24, enables the spool 24 to undergo thermally induced growth while providing a void or space into which such growth can be, at least to a significant degree, directed. Accordingly, the wire coil 30 need not experience the otherwise (in the absence of such relief means 104) comparatively large radial expansion force developed by the thermally induced growth in the spool section 24.

Although the relief or slot means 104 may extend further into body portion 18, in the preferred embodiment the inner end 108 thereof, preferably formed as to have a curvilinear projected configuration, is situated generally tangentially to surface 26. Further, even though the relief means 104 may be of any general configuration, in projection, as for example, curvilinear or helical or skew (with reference to the centerline 110), in the preferred embodiment such relief or area of discontinuance 104 is formed as to be generally parallel to such centerline 110 as viewed in FIG. 5. Further, as can best be seen in FIGS. 3 and 5, the slot-like opening or means 104 provides an extra benefit as by permitting portion 50 of wire means 30 to pass therethrough for attachment to terminal end 42. In such an arrangement, portion 50 could be juxtaposed against surface 24 with other coils or turns placed against portion 50, radially outwardly thereof, and still not result in any problem for attaching end 52 to such terminal end 42.

Although only a preferred embodiment of the invention has been disclosed and described, it is apparent that other embodiments and modifications of the invention are possible within the scope of the appended claims.

I claim:

1. A temperature sensor assembly, comprising a dielectric generally cylindrical support body, said support body having first and second axially opposite ends, a first generally medially situated axially extending recess formed in said first end of said support body as to extend toward said second end but for only a portion of the axial distance between said first and second ends, said axially extending recess effectively defining a tubular axially extending portion of said cylindrical support body, a length of thermally responsive first electrical conductor means, said conductor means being coiled about and carried by said tubular axially extending portion of said support body, said conductor means having first and second conductor ends effective for electrical connection to associated second conductor means, and at least one relief portion means formed through said support body, said relief portion means comprising a generally axially extending slot formed in said first axially opposite end and through said tubular axially extending portion of said support body as to thereby form a corresponding at least one discontinuous portion in said tubular axially extending portion of said support body, said axially extending slot having a first open end in said first axially opposite end and having a second closed end effectively terminating said axially extending slot at an axial distance away from said second axially opposite end of said support body, said discontinuous portion being so located as to have portions of said coiled conductor means bridging said discontinuous portion.

2. A temperature sensor assembly, comprising a support body, said support body being comprised of plastic material, a length of thermally responsive first electrical conductor means, said conductor means comprising wire means being coiled about and carried by said support body, said conductor means having first and second ends effective for electrical connection to associated second conductor means, at least one relief portion means formed through said support body as to thereby form a corresponding at least one discontinuous portion in said support body, said discontinuous portion being so located as to have portions of said coiled wire means bridging said discontinuous portion, said relief portion means comprising at least one slot-like opening formed through said support body, said second conductor means comprising first and second terminal members carried by said support body as to pass therethrough, said first terminal member having first and second terminal ends respectively extending beyond opposite ends of said support body, said second terminal member having third and fourth terminal ends respectively extending beyond said opposite ends of said support body, said first end of said wire means being electrically connected to said first end of said first terminal member, said second end of said wire means being electrically connected to said third end of said second terminal member, and further comprising housing means encompassing at least a major portion of said support body and encompassing said first and third ends of said first and second terminal members while permitting said second and fourth ends of said terminal members to be exposed for connection to related electrical circuit means.

3. A temperature sensor assembly according to claim 2 wherein said support body comprises a flange-like securing surface, wherein said housing means comprises a cup-like configuration having an end wall integrally formed with a generally tubular side wall terminating at an open end with said open end comprising a retainer portion operatively engaging said securing surface to thereby maintain said support body and housing means in assembled relationship, and said housing means further comprising an externally threaded portion effective for threadably engaging a cooperating internally threaded aperture of associated structure means.

4. A temperature sensor assembly according to claim 3 and further comprising tool-engaging surface means carried by said housing means, said tool-engaging surface means being effective to be operatively engaged by associated tool means for attaining seated engagement as between said externally threaded portion and said cooperating internally threaded aperture.

5. A temperature sensor assembly according to claim 3 wherein said support body has an outer diameter at least closely received within an inner surface of said outer housing, and wherein said end wall of said housing means is axially spaced from said first and third ends of said first and second terminal members.

6. A temperature sensor assembly, comprising a suport body, a length of thermally responsive first electrical conductor means, said conductor means being coiled about and carried by said support body, said conductor means having first and second ends effective for electrical connection to associated second conductor means, at least one relief portion means formed through said support body as to thereby form a corresponding at least one discontinuous portion in said support body, said discontinuous portion being so located as to have portions of said coiled conductor means bridging said discontinuous portion, said relief portion means comprising at least one slot-like opening formed through said support body, said second conductor means comprising first and second terminal members carried by said support body as to pass therethrough, said first terminal member having first and second terminal ends respectively extending beyond opposite ends of said support body, said second terminal member having third and fourth terminal ends respectively extending beyond said opposite ends of said support body, said first end of said coiled conductor means being electrically connected to said first end of said first terminal member, said second end of said coiled conductor means being electrically connected to said third end of said second terminal member, and further comprising housing means encompassing at least a major portion of said support body and encompassing said first and third ends of said first and second terminal members while permitting said second and fourth ends of said terminal members to be exposed for connection to related electrical circuit means.

7. A temperature sensor assembly according to claim 6 wherein said support body comprises a flange-like securing surface, wherein said housing means comprises a cup-like configuration having an end wall integrally formed with a generally tubular side wall terminating at an open end with said open end comprising a retainer portion operatively engaging said securing surface to thereby maintain said support body and housing means in assembled relationship, and said housing means further comprising an externally threaded portion effective for threadably engaging a cooperating internally threaded aperture of associated structure means.

8. A temperature sensor assembly according to claim 7 and further comprising tool-engaging surface means carried by said housing means, said tool-engaging surface means being effective to be operatively engaged by associated tool means for attaining seated engagement as between said externally threaded portion and said cooperating internally threaded aperture.

9. A temperature sensor assembly according to claim 7 wherein said support body has an outer diameter at least closely received within an inner surface of said outer housing, and wherein said end wall of said housing means is axially spaced from said first and third ends of said first and second terminal members.

10. A temperature sensor assembly, comprising a support body, a length of thermally responsive first electrical conductor means, said conductor means being coiled about and carried by said support body, said conductor means having first and second ends effective for electrical connection to associated second conductor means, at least one relief portion means formed through said support body as to thereby form a corresponding at least one discontinuous portion in said support body, said discontinuous portion being so located as to have portions of said coiled conductor means bridging said discontinuous portion, said second conductor means comprising first and second terminal members carried by said support body as to pass therethrough, said first terminal member having first and second terminal ends respectively extending beyond opposite ends of said support body, said second terminal member having third and fourth terminal ends respectively extending beyond said opposite ends of said support body, said first end of said coiled conductor means being electrically connected to said first end of said first terminal member, said second end of said coiled conductor means being electrically connected to said third end of said second terminal member, and further comprising housing means encompassing at least a major portion of said support body and encompassing said first and third ends of said first and second terminal members while permitting said second and fourth ends of said terminal members to be exposed for connection to related electrical circuit means.

11. A temperature sensor assembly according to claim 10 wherein said support body comprises a flange-like securing surface, wherein said housing means comprises a cup-like configuration having an end wall integrally formed with a generally tubular side wall terminating at an open end with said open end comprising a retainer portion operatively engaging said securing surface to thereby maintain said support body and housing means in assembled relationship, and said housing means further comprising an externally threaded portion effective for threadably engaging a cooperating internally threaded aperture of associated structure means.

12. A temperature sensor assembly according to claim 11 and further comprising tool-engaging surface means carried by said housing means, said tool-engaging surface means being effective to be operatively engaged by associated tool means for attaining seated engagement as between said externally threaded portion and said cooperating internally threaded aperture.

13. A temperature sensor assembly according to claim 11 wherein said support body has an outer diameter at least closely received within an inner surface of said outer housing, and wherein said end wall of said housing means is axially spaced from said first and third ends of said first and second terminal members.

14. A temperature sensor assembly according to claim 1 wherein said tubular axially extending portion comprises a first generally radially outwardly extending annular flange surface means and a second generally radially outwardly extending annular flange surface means, wherein said first and second annular flange surface means are axially spaced from each other as to define an axially extending space therebetween carrying said first electrical conductor means, and wherein said slot passes through said first annular flange surface means.

15. A temperature sensor assembly according to claim 14 and further comprising housing means encompassing all of said tubular axially extending portion and all of said first and second annular flange surface means while also encompassing at least a major portion of said support body, said housing means operatively internally engaging portions of said dielectric support body as to thereby maintain said first electrical conductor means spaced from said housing means.

16. A temperature sensor assembly according to claim 1 wherein said second conductor means comprises first and second terminal members carried by said support body as to pass therethrough, said first terminal member having first and second terminal ends respectively extending beyond said first and second axially opposite ends of said support body, said second terminal member having third and fourth terminal ends respectively extending beyond said first and second axially opposite ends of said support body, wherein said first conductor end of said first conductor means is electrically connected to said first end of said first terminal member, wherein said second conductor end of said first conductor means is electrically connected to said third end of said second terminal member, and further comprising housing means encompassing at least a major portion of said support body and encompassing said first and third ends of said first and second terminal members while permitting said second and fourth ends of said terminal members to be exposed for connection to related electrical circuit means.

17. A temperature sensor assembly according to claim 16 wherein said support body comprises a flange-like securing surface, wherein said housing means comprises a cup-like configuration having an end wall integrally formed with a generally tubular side wall terminating at an open end with said open end comprising a retainer portion operatively engaging said securing surface to thereby maintain said support body and housing means in assembled relationship, and said housing means further comprising an externally threaded portion effective for threadably engaging a cooperating internally threaded aperture of associated structure means.

18. A temperature sensor assembly according to claim 17 and further comprising tool-engaging surface means carried by said housing means, said tool-engaging surface means being effective to be operatively engaged by associated tool means for attaining seated engagement as between said externally threaded portion and said cooperating internally threaded aperture.

19. A temperature sensor assembly according to claim 18 wherein said support body has an outer diameter at least closely received within an inner surface of said outer housing, and wherein said end wall of said housing means is axially spaced from said first and third ends of said first and second terminal members.

* * * * *